W. KAVANAGH.
OMELET PAN.
APPLICATION FILED JULY 13, 1917.
1,292,476.
Patented Jan. 28, 1919.
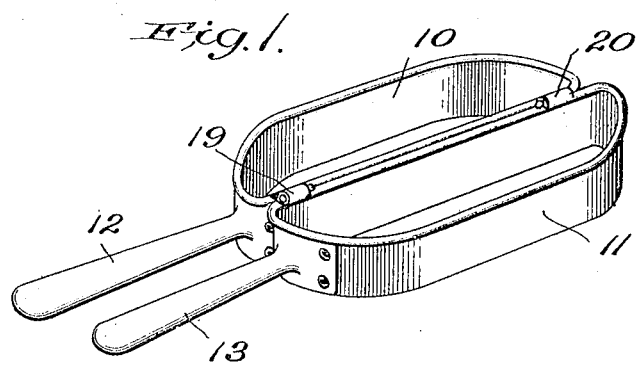
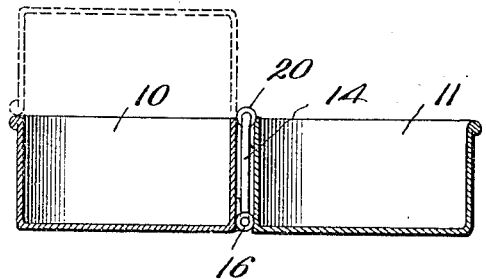
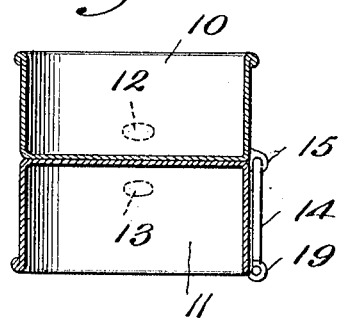
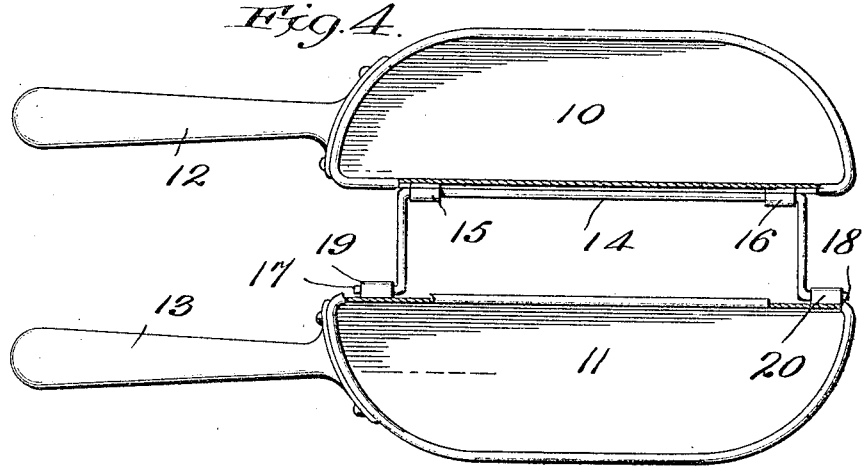
Inventor
William Kavanagh,
By his Attorney
H. S. MacKay

UNITED STATES PATENT OFFICE.

WILLIAM KAVANAGH, OF YONKERS, NEW YORK.

OMELET-PAN.

1,292,476. Specification of Letters Patent. Patented Jan. 28, 1919.

Application filed July 13, 1917. Serial No. 180,272.

*To all whom it may concern:*

Be it known that I, WILLIAM KAVANAGH, a subject of the King of Great Britain, residing at Yonkers, in the county of Westchester and State of New York, have invented certain new and useful Improvements in Omelet-Pans; and I do hereby declare the following to be a full, clear, and exact description of the invention, such as will enable others skilled in the art to which it appertains to make and use the same.

The present invention relates to an improvement in that form of omelet pan which is made in two parts hinged together, so that, after the two halves of an omelet have been browned on one side of each they can be joined so as to make a single omelet browned on both sides.

Pans of this character as hitherto constructed have been very inconvenient to use for the reason that, when the omelet is completed, the entire double pan in its open position must be inverted over the dish intended to receive the omelet. Both hands must be used in doing this and it requires considerable dexterity to make the omelet fall flat in the middle of the dish without crumpling, folding or breaking. My improved form of pan makes it possible to carry out the same cooking operation as is followed with the folding or hinged pans hitherto employed, and at the same time avoids the difficulties above pointed out, as it can be used with one hand and it is so constructed as greatly to facilitate tipping the omelet into the dish without breaking or crumpling.

My improvement is illustrated in the accompanying drawings, wherein Figure 1 is a perspective view of the hinged pan, Fig. 2 is a transverse sectional view of the same, Fig. 3 is a similar view of the same showing the final position of the two halves when dishing up the omelet, and Fig. 4 is a plan view of the pan with the two halves separated.

As in pans of this character already known, there are two halves 10 and 11 of identical shape, having each a straight side adapted when in use to rest against or close to the straight side of its fellow. Each is provided with a suitable handle 12, 13.

The two halves are joined by a swinging joint pivoted to both and adapted to permit the two to be separated as shown in Fig. 4. This joint consists preferably of a stout wire bail 14 mounted revolubly in ears 15, 16, at the bottom of one side of one of the half pans, as 10. The extremities of the bail 14 are turned outward as shown at 17 and 18, and fit ears 19 and 20 at the top of the adjacent straight side of the other half pan 11.

When the two halves of the omelet are being browned, the pan occupies the position shown in Figs. 1 and 2. When the browning is completed one half pan, as 11, is turned over by means of its handle into the position shown in dotted lines in Fig. 2, thereby bringing the two unbrowned sides of the halves of the omelet together in the pan 10.

This operation is, so far, the same as that employed with the well known hinged omelet pans; but in the next operation my improved pan is used quite differently, and with greater convenience and effectiveness. This next operation is the tipping of the completed omelet onto the dish, and for this purpose my improved construction makes it possible to turn the empty half pan 11 completely upside down, bringing it in an inverted position under the bottom of the full pan 10, as shown in Fig. 3. In this position the two handles 12 and 13 are near enough together to permit of both being grasped in one hand, while the combined pans are inverted over the dish which receives the omelet.

Since one half pan is directly under the other, and the two bottoms are in flat contact, the hand as it grasps the two handles tends to draw them together, and the two half pans can thus be handled without fear of the half pans doubling together, as they would be likely to do if one hand were used with the old form of jointed pan.

What I claim is—

1. An omelet pan composed of two similar halves side by side and joining means for said halves adapted to permit one-half to be inverted either over or under the other half.

2. An omelet pan composed of two similar halves, and a joining bail pivotally connected near the bottom of one side of one half pan and near the top of the contiguous side of the other half pan.

In testimony whereof, I affix my signature.

WILLIAM KAVANAGH.

Copies of this patent may be obtained for five cents each, by addressing the "Commissioner of Patents, Washington, D. C."